US005788033A

United States Patent [19]

Lücking et al.

[11] Patent Number: 5,788,033

[45] Date of Patent: Aug. 4, 1998

[54] ARRANGEMENT FOR SUPPLYING POWER TO AN ELECTRIC LOCOMOTIVE

[75] Inventors: Manfred Lücking; Dieter Zimek, both of Essen, Germany

[73] Assignee: Krupp Fordertechnik GmbH, Essen, Germany

[21] Appl. No.: 897,141

[22] Filed: Jul. 21, 1997

[30] Foreign Application Priority Data

Jul. 19, 1996 [DE] Germany ........................ 196 29 126.7

[51] Int. Cl.[6] ........................ B60L 9/00

[52] U.S. Cl. ........................ 191/33 R; 191/1 R; 191/11; 191/22 R

[58] Field of Search ........................ 191/1 R, 11, 22 R, 191/33 R, 40

[56] References Cited

U.S. PATENT DOCUMENTS 5,609,460 3/1997 Abel et al. ........................ 414/334

FOREIGN PATENT DOCUMENTS 56097 7/1982 European Pat. Off. ............ 191/33 R 204387 9/1907 Germany .

214565 5/1908 Germany .

215856 5/1908 Germany .

462902 7/1928 Germany .

4233007 4/1994 Germany .

86366 8/1955 Norway ........................ 191/11

*Primary Examiner*—S. Joseph Morano

*Attorney, Agent, or Firm*—Spencer & Frank

[57] ABSTRACT

An arrangement for supplying power to an electric locomotive (1) while the locomotive is passing through a section which is not spanned by a contact wire, for example, while passing through a transshipment facility. To supply power to the locomotive (1) which has a current collector (2), a movable supply car (3) is provided, with the movable supply car (3) having an arm (4) on which a current collector bow (5), which simulates a contact wire, is mounted. The locomotive (1) and the supply car (3) are coupled to a path measuring system which orients the position of the current collector bow (5) toward the respective position of the current collector (2) of the locomotive (1)

11 Claims, 3 Drawing Sheets

ARRANGEMENT FOR SUPPLYING POWER TO AN ELECTRIC LOCOMOTIVE

REFERENCE TO RELATED APPLICATIONS

This application claims the priority of German application 196 29 126.7, filed Jul. 19, 1996, which is incorporated herein by reference.

BACKGROUND OF THE INVENTION

The invention relates to an arrangement for supplying power to an electric locomotive while the locomotive is passing through a section which is not spanned by an electrical contact wire, for example, while passing through a transshipment facility.

In the course of a route travelled by electric locomotives, there are track sections which are not spanned by an electrical contact wire, for example, in transshipment facilities for the combined loading traffic between rail and road vehicles. The electric locomotives must pass through these transshipment facilities at a low speed. But it is often not possible to provide an electrical contact wire for supplying power to the locomotives within the transshipment facility because of the necessary presence of a gantry crane or an articulated boom crane above the tracks in the area of these transshipment facilities.

Therefore, the power supply of electric locomotives within a transshipment facility requires either a contact wire which can be pivoted away, with the contact wire frequently having to be pivoted away across several tracks, or transshipment equipment which can lift and transship all loading units customary in combined loading traffic below the contact wire. In either case, working spaces for the transshipment equipment are very confined and time-consuming transshipment processes ensue.

It is the object of the present invention to avoid the above described difficulties by providing a flexible and efficient power supply for the electric locomotives.

SUMMARY OF THE INVENTION

The above object generally is accomplished according to the present invention by an arrangement for supplying electrical power to an electric locomotive having a current collector when the locomotive is passing through a section of track which is not provided with a current contact wire for the collector, which arrangement comprises: a movable electric supply car which has a movable arm; a current collector bow, which simulates a contact wire, mounted on an end of the arm; and a path measuring or sensing system coupled to the locomotive and to the supply car, for controlling the position of the current collector bow and orients same toward the respective position of and into contact with the current collector of the locomotive.

Due to the fact that the supply car moves synchronously with the locomotive as a result of the configuration of the arrangement according to the invention, a flawless power supply to the locomotive is ensured and the disadvantages of the known arrangements cannot occur.

According to a preferred feature of the invention, a mechanical pivot arrangement for the current collector bow is mounted on the arm of the power supply, which pivot arrangement permits the current collector bow to simulate a contact wire with sinusoidal lateral swing so that, during the entire passage of the locomotive through the transshipment facility, the current collector bow acts like a standard contact wire.

Advisably, the power is supplied to the supply car via a sliding contact which engages a contact rail or via a cable.

Moreover, the supply car can be provided with track wheels and can be movable on the railroad tracks for the locomotive.

According to a further feature of the invention, the supply car is provided with support wheels and guide wheels which run on the top and side surfaces, respectively, of corresponding I-rails. This permits an arbitrary arrangement of the guideway for the supply car.

Depending on the type of transshipment facility, the supply car is guided either ahead of or behind the locomotive, or next to the locomotive. A supply car guided ahead of the locomotive can be moved by the locomotive itself via an auxiliary arrangement.

In a preferred embodiment of the invention, the supply car is guided on the elevated crane track usually found in such transshipment facilities. In this case, the power supply is particularly straightforward because the drive energy for the transshipment equipment, e.g., the crane, is also transmitted and present here.

To simplify the production and the handling of the arrangement, the arm is configured with a light-weight tube frame construction which, according to a further feature of the invention, is provided with articulated joints or pivot hinges so that the arm can adapt without difficulty to the contour of the appropriate portion of the locomotive e.g., the head, the rear or the side.

The drawings, which follow, schematically illustrate several embodiments of the invention, and will be used in the description of the invention below.

DETAILED DESCRIPTION OF THE PREFERRED EMBODIMENT

Figure 1:
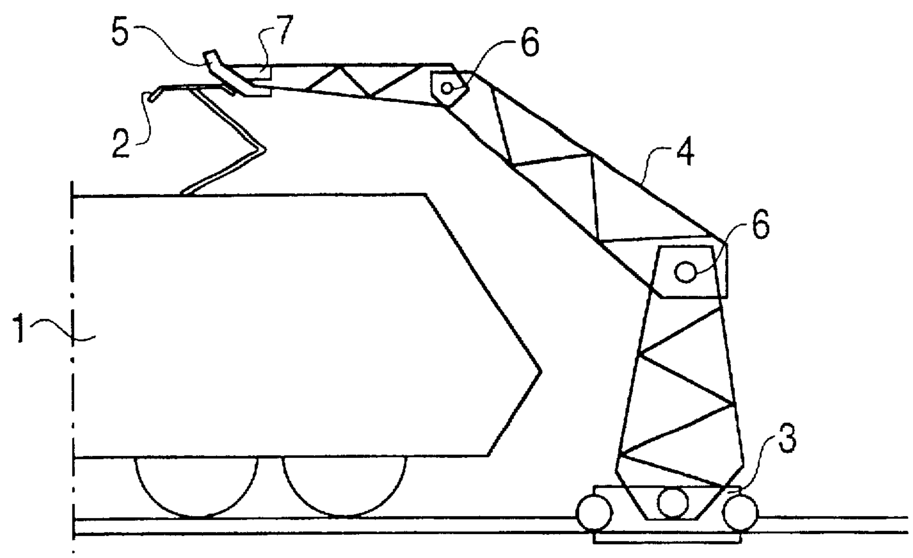
FIG. 1 is a schematic side view of the front section of an electric locomotive with a power supply car according to the invention arranged ahead of the locomotive.
Figure 2:
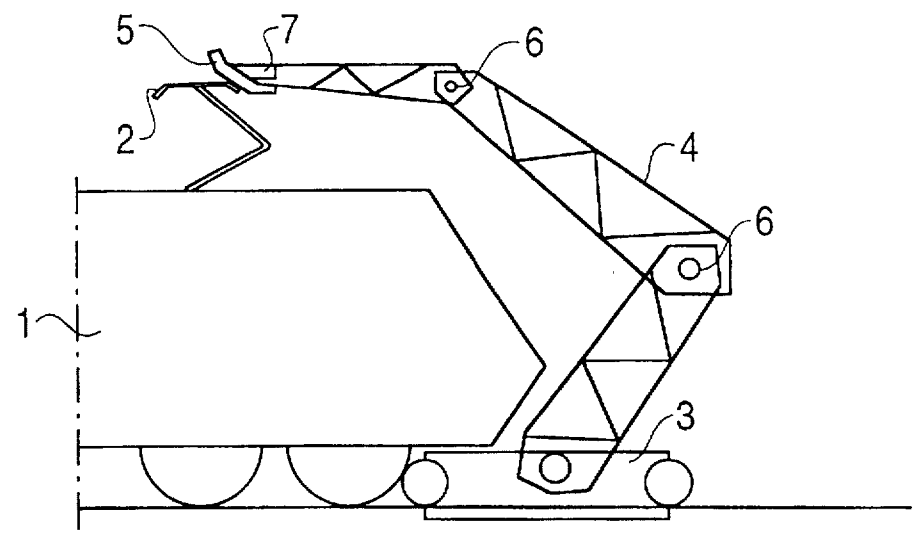
FIG. 2 is a schematic side view of the front section of a locomotive with a different power supply car according to the invention arranged ahead of the locomotive.

The electric locomotive 1 shown in FIGS. 1 and 2 is provided with a current collector 2 in a conventional manner. Ahead of the locomotive 1—related to the direction of travel of the locomotive 1—there is a power supply car 3 which is provided with an adjustable and movable arm 4. On the free end of the arm 4 is mounted a current collector bow 5 which assumes the function of and simulates a contact wire for the locomotive. The locomotive 1 and the supply car 3 are connected to a known path measuring or sensing system not shown in this figure. The path measuring or sensing system controls and orients the position of the current collector bow 5 toward the respective position of the current collector 2 of the locomotive 1.

In the embodiment illustrated in FIG. 2, the supply car 3 is moved by the locomotive 1 itself, i.e., by pushing it along the tracks.

The arm 4, which preferably is configured with a light-weight tubular frame construction with articulated joints 6, has a mechanical pivot arrangement 7 for the current collector bow 5 mounted at its free end so that the current collector bow 5 can move and remain in contact with the current collector 2 of the locomotive.

Figure 3:
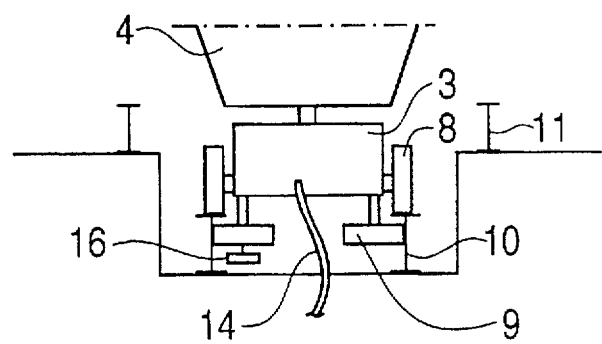
FIG. 3 is a schematic front view of a modified power supply car according to the invention.

As is indicated in FIG. 3, the supply car 3 may be provided with support wheels 8 which ride on the upper surface of the I-tracks 10 in a conventional manner and with non-driven guide wheels 9 which rotate about respective vertical axes and run on the respective inner surfaces of the I-tracks 10. In the illustrated embodiment, the I-tracks 10 are arranged between the railroad tracks 11 for the locomotive 1 so that the supply car 3 can be guided ahead of or behind the locomotive moving on the railroad tracks 11. As shown in this figure, the supply car 3 may be provided with electrical power via a cable 14, with the power being used to supply power to the locomotive 1 and, if necessary, to move the supply car 3 along the track, e.g., by driving its wheels 8, and to move the arm 4 as needed.

Figure 4:
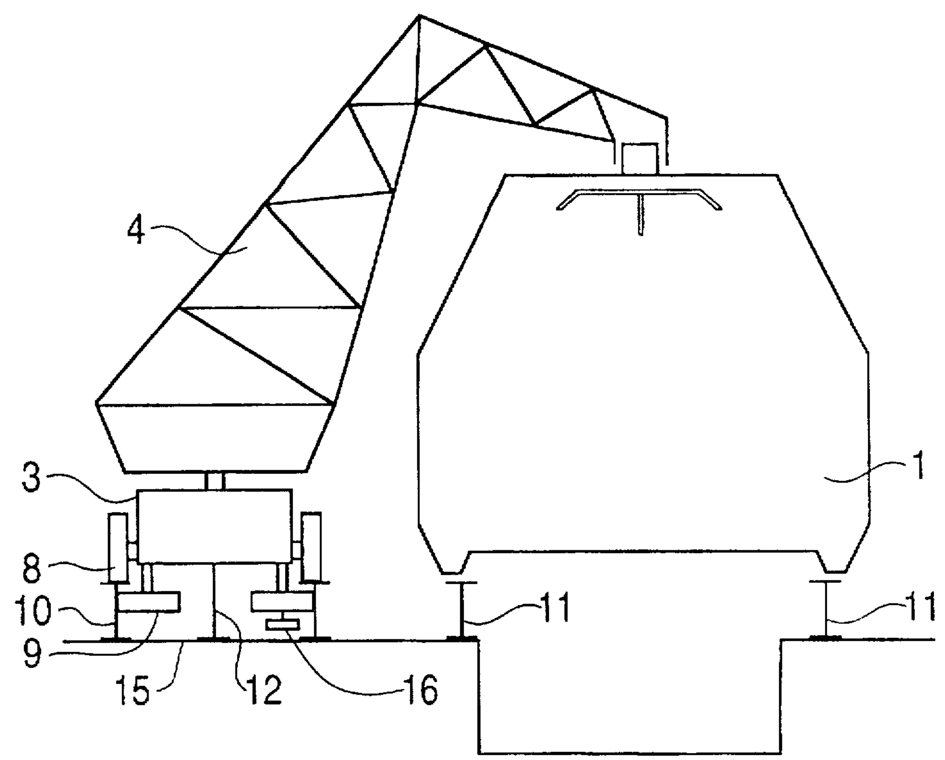
FIG. 4 is a schematic front view showing the clearance gauge or profile of a locomotive with a supply car according to the invention arranged next to the locomotive.
Figure 5:
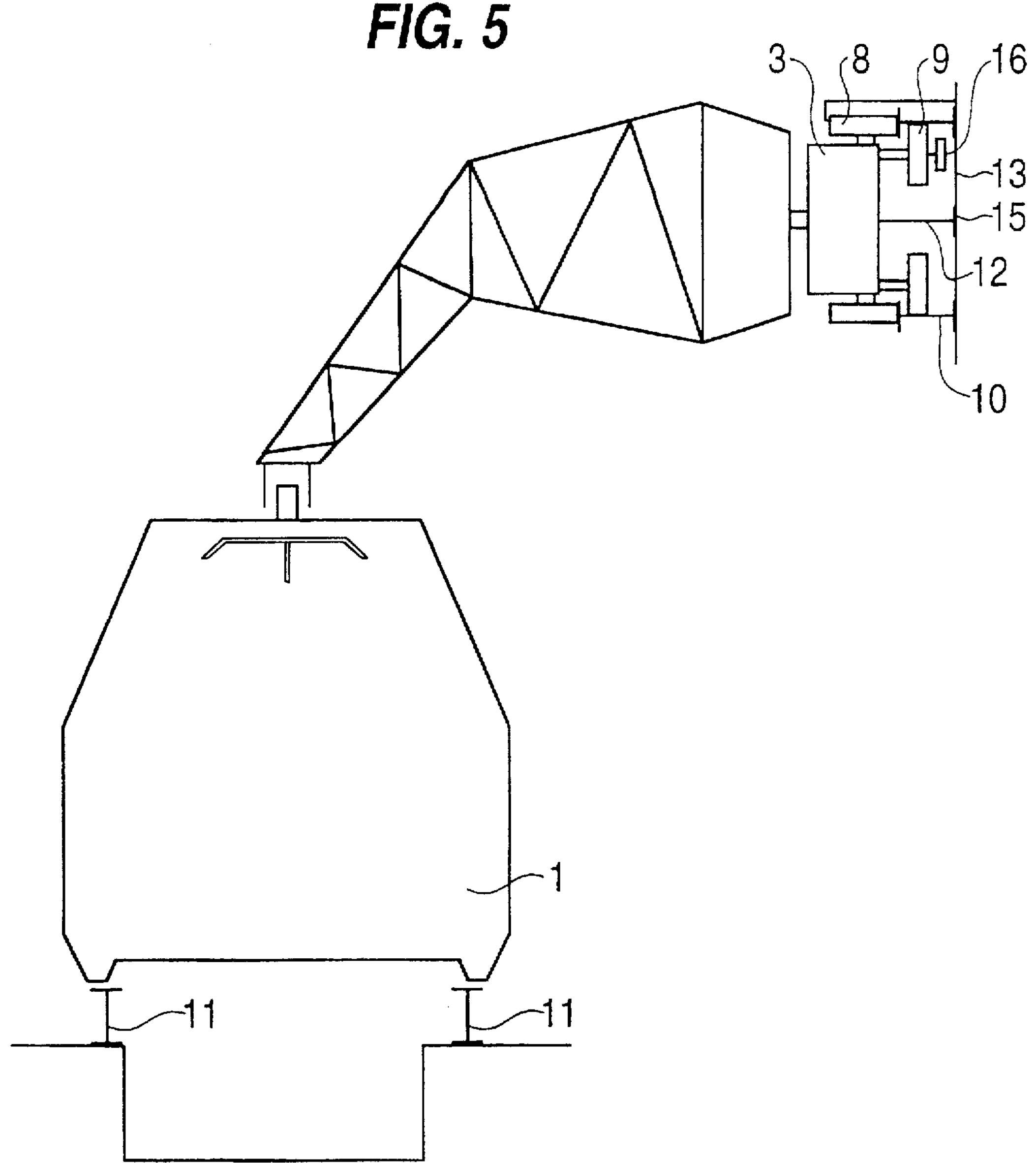
FIG. 5 is a schematic front view showing the clearance gauge or profile of a locomotive with a supply car according to the invention arranged on the adjacent elevated crane track.

In the embodiments illustrated in FIGS. 4 and 5, I-tracks 10 are arranged next to the railroad tracks 11 and thus next to the locomotive 1 indicated by its clearance gauge. In each case, the supply car 3 thus is guided next to the locomotive 1. Moreover, as shown in each of FIGS. 4 and 5, the power to the supply car 3 is supplied via a sliding contact 12 which engages an additional energized track conductor or contact rail 15. However, in these embodiments as well as in the other embodiments of the supply car 3, power may be supplied to the car 3 in any conventional manner, for example, by a cable 14 as shown in FIG. 3.

As can be seen from FIG. 5, the I-tracks 10 can also be arranged on the elevated crane track 13 so that the supply car 3 is guided on the elevated crane track 13.

As can further be seen from FIGS. 3, 4 and 5, the previously mentioned path measuring system 16 is on one of the non-driven wheels 9 of the supply car. This system 16 serves to detect the position of the supply car 3 relative to the locomotive 1 and to synchronize the relative positions (see FIG. 1 or 2). However no direct connection between the system 16 and the locomotive exists.

The invention now being fully described, it will be apparent to one of ordinary skill in the art that any changes and modifications can be made thereto without departing from the spirit or scope of the invention as set forth herein.

What is claimed:

1. An arrangement for supplying power to an electric locomotive, having a current collector for contacting a contact wire to supply current to the locomotive while the locomotive is passing through a section of track which is not spanned by an electrical contact wire for the current collector, said arrangement comprising:

a movable electrical power supply car disposed for movement along a path adjacent the locomotive within the section and having a movable arm;

a current collector bow, which simulates an electrical contact wire, mounted on the arm; and, a path sensing system coupled to the locomotive and to the supply car for controlling the position of the current collector bow to orient same toward a respective position of and into contact with the current collector of the locomotive.

2. An arrangement according to claim 1, wherein the current collector bow is mounted on the arm via a mechanical pivot arrangement, which pivot arrangement permits the current collector bow to simulate a contact wire with sinusoidal lateral swing.

3. An arrangement according to claim 1, wherein the electrical power is supplied to the supply car via a sliding contact.

4. An arrangement according to claim 1, wherein the electrical power is supplied to the supply car via a cable.

5. An arrangement according to claim 1 wherein the supply car is provided with support wheels and guide wheels which run on respective top and side surfaces of I-rails.

6. An arrangement according to claim 1, wherein the supply car is guided ahead of or behind the locomotive.

7. An arrangement according to claim 1, wherein the supply car is guided on tracks disposed next to tracks for the locomotive.

8. An arrangement according to claim 7, wherein the supply car is guided on an elevated crane track which extends through the section.

9. An arrangement according to claim 1, wherein the arm has a light-weight tube frame construction.

10. An arrangement according to claim 9, wherein the light-weight tube frame construction of the arm is provided with articulated joints.

11. An arrangement for supplying power to an electric locomotive, having a current collector for contacting a contact wire to supply current to the locomotive while the locomotive is passing through a section of track which is not spanned by an electrical contact wire for the current collector, said arrangement comprising:

a movable electrical power supply car disposed for movement along a path adjacent the locomotive within the section and having a movable arm;

a current collector bow, which simulates an electrical contact wire, mounted on the arm; and, means coupled to at least the supply car for controlling the position of the current collector bow to orient same toward a respective position of and into contact with the current collector of the locomotive.

* * * * *